UNITED STATES PATENT OFFICE.

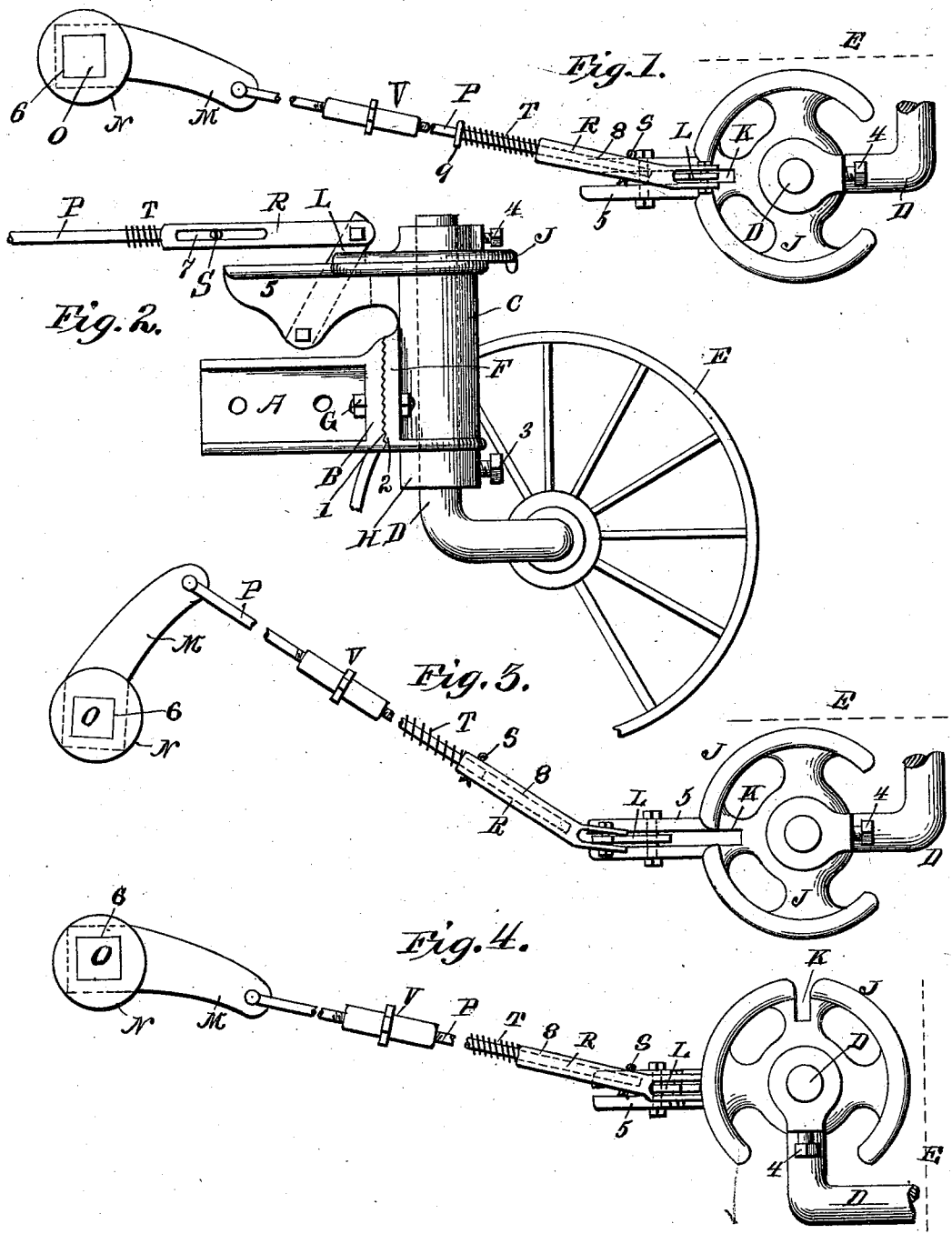

CHARLES S. RUEF, OF DIXON, ILLINOIS, ASSIGNOR TO THE GRAND DETOUR PLOW COMPANY, OF SAME PLACE.

RIDING-PLOW.

SPECIFICATION forming part of Letters Patent No. 553,600, dated January 28, 1896.

Application filed October 22, 1895. Serial No. 566,459. (No model.)

*To all whom it may concern:*

Be it known that I, CHARLES S. RUEF, a citizen of the United States, residing at Dixon, in the county of Lee and State of Illinois, have invented certain new and useful Improvements in Riding-Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has reference to certain improvements in wheeled plows, and refers more especially to that class of wheeled plows in which the front wheel or wheels are deflected by the team to change the direction of the plow and in which the rear of the plow is supported by a furrow wheel or wheels which follow the plow in the newly-made furrow.

My invention is an improvement upon the structure for which on November 23, 1886, I was granted United States Letters Patent No. 353,234.

In the structure last named the front of the plow is adjustably carried upon a wheel having its path in the last previously-made furrow. This wheel is seated on the lower end of a vertical standard or axle upon which as a fulcrum the forward end of the plow is raised, lowered, or adjustably carried. Such standard is adapted to be turned axially by the draft of the team either to the right or left to guide the plow or to turn the latter at the end of the furrow.

The rear furrow-wheel before alluded to is a caster-wheel, but in the progress of the plow it should be locked against lateral vibration, so that the plow may run even and true; also, in backing up it is necessary that said rear wheel be locked to prevent it twisting and thereby throwing the rear end of the plow laterally out of line. In my said prior construction such locking of the rear wheel was accomplished by a positive device under control of the driver. The only objection to this was that the driver sometimes forgot to release the lock when he turned at the end of the field, and the draft of the team exerted against the side of said wheel tended to injure it or some of its adjunctive parts.

Automatic control of the rear wheel through and by means of the flexion of the front wheel has heretofore been attempted; but one objection thereto is that all casual lateral oscillations of said front wheel are communicated instantly to said rear wheel, and the movement of the latter being in a reverse direction from that of the former the plow was subjected to an undesirable lateral wiggle. In my invention it is the purpose to lock and unlock the said rear wheel through and by means of the lateral turn which the team gives to the front wheel and coincidently with the latter, but to exert no influence upon the rear wheel beyond merely locking and unlocking it. As the only time when the rear wheel needs to be unlocked, so as to have its caster action, is when the plow is being turned at the end of the furrow, the mere locking and unlocking of said rear wheel at the end of the furrow is all the interference with said wheel that is required. To prevent the casual oscillation of said front wheel being communicated to said rear wheel in the normal progress of the plow, I provide a spring connection which admits of a limited movement of the connecting-rod without affecting the lock of said rear wheel.

An additional element in my present invention is a provision for adjusting laterally the position of the vertical sleeve in which the stem or axle of said rear wheel is vertically pivoted, whereby the mutual relation of the rear of the plow-beam and said rear wheel is regulated and the lateral pitch of the plow accomplished.

Inasmuch as my invention is applicable to each of the various types of wheel-plows, and the construction and general parts of the same are well known, I do not deem it necessary to show or describe an entire plow, but only so much thereof as will illustrate the location, relation and operation of my invention.

I attain the above objects by the employment of the devices illustrated in the accompanying drawings, in which—

Figure 1 is a detailed plan view of my invention when the plow is at work. Fig. 2 is a detailed side elevation of the same. Fig. 3 is a detail of the position of the parts when the lock of the rear wheel is withdrawn by the turning of the front standard, but the plow itself has not yet been turned laterally. Fig. 4 is a detail of the position of the parts after the plow has been turned, but the rear wheel remains substantially in its original position, as no forward movement has yet been made. The further lineal movement of the plow will bring the rear wheel around into the position shown in Fig. 2, its normal position when at work.

Similar letters and figures refer to similar parts throughout the several views.

Referring to Fig. 2, A is the rear end of a plow-beam or of a plate which is the rearward extension thereof, the back end of which is formed into a disk B, transversely of the plow, and provided on its rear side with corrugations 1.

C is a vertical sleeve which forms the pivotal seat of the vertical axle D of the rear furrow-wheel E. The sleeve C is provided on its forward surface, transversely of the plow, with a disk F, having corrugations 2 in its forward surface adapted to interlock with the corrugations 1 of disk B. These corrugations are held in and desired mutual relation by means of the transverse bolts G, one on each side of the plate or beam A. By this means the mutual relation of the wheel E and the plow-beam A is adjusted as may be desired.

The vertical position of the beam A with reference to the wheel E is adjusted by means of a collar H seated around the axle D below the sleeve C, and rigidly held at any position on said axle by means of the set-screw 3 seated in the wall of said collar, and a cap-plate J rigidly seated on the axle D above the sleeve C by means of set-screw 4 seated in the wall of said cap, and bearing at its inner end against said axle.

In what is the front edge of the cap-plate J when the plow is in a working position is formed a vertical recess K having diverging walls.

L is a lever pivotally seated at its base in the forward extension 5 of the sleeve C in position to be oscillated in the line of the plow-beam and intermittently engage the recess K to lock the wheel E to the beam A against lateral oscillation. M is an arm formed on the collar N, seated on the vertical axle O of the front furrow-wheel. The collar N has a square opening 6 which receives the square-sided axle O, and therefore the lateral turn given to said axle by the team when turning at the end of the furrow imparts a segmental orbital movement to the outer end of the arm M. An actuating-rod P is loosely connected at its forward end to the outer extremity of the arm M, and at its rear end to the upper end of the lock-lever L in the manner hereinafter described. A sleeve R is pivotally attached at its rear end to the upper end of the lever L, and provided with longitudinal central opening 8 and lateral slots 7. The rear end of the rod P is projected within the opening 8 of said sleeve R, and provided with a cotter S seated transversely in the end of the said rod P, and projected laterally each way into the longitudinal slots 7. A collar 9 is seated on the rod P a short distance in advance of its rear end, and between said collar and the forward end of the sleeve R a compression-spring T is seated around the rod P.

When the plow is at work the cotter S is about midway the slots 7, so that in the casual oscillation of the front axle O said cotter will play forward and back in said slot without affecting the sleeve R or the lever L; but when the front axle O is given a quarter-turn at the end of the furrow the arm M, which theretofore projected rearward, is given a quarter-rotation and first draws the cotter S against the front end of the slots 7, and, secondly, by such engagement, draws the sleeve R forward and the lever L out of the recess K of the plate J. The axle of the wheel E is then free to rock laterally. The first forward movement of the team turns the plow substantially at right angles with its former position, and in this movement the axle of wheel E takes the position shown in Fig. 4, said wheel being in a line transversely to the plow, and as the plow-beam is being turned to its new position the wheel carries the rear end of the beam in a direction contrary to the movement of its forward end, and thus accomplishes a short turn, being virtually a turn upon the plow proper as a pivot. As the team moves forward in the new direction, the caster quality of the wheel E causes it to at once align itself with the plow and brings the recess K forward into position to be locked, as shown in Fig. 1. After the plow has turned, and before the wheel E has accommodated itself to the new direction, the rearward thrust of the rod P (occasioned by the arm M having swung into its normal position—i. e., projecting toward the rear of the plow) is permitted by the rear end of said rod P passing to or near the rear end of the opening 8 of the sleeve R. The spring T is thereby compressed between the collar 9 and sleeve R, and the lever L is thereby pressed against the curved side of the cap J, as shown in Fig. 4, in position to be thrust into the recess K by the expansion of the spring T as soon as the recess K is brought into a line with the plow or to the front of axle D. When the lever L enters said recess, it again locks the wheel E, and the compression of the spring T being relieved the cotter S returns to the intermediate portion of slot 7.

For the purpose of adjusting the rod P lineally the latter is made in two sections, the adjacent ends of which are inserted respectively in the ends of a cylindrical nut V.

What I claim as my invention, and desire to secure by Letters Patent of the United States, is—

1. In a wheel plow, the combination of the rod P attached at its forward end directly or indirectly to the vertical axle of the front carriage which is turned laterally by the team, and provided with collar 9, and projected at its rear end within the sleeve R, a sleeve R provided with slots 7 and pivotally connected to the lever L, a cotter S extending through the rear end of said rod P and into slot 7 respectively, and spring T seated on said rod between said collar 9 and sleeve R, substantially as shown and for the purpose described.

2. In a wheel plow, the combination of a plate J seated on the vertical axle of the rear furrow wheel, and adapted normally to be rotated therewith, and provided with a recess K, a lever L pivotally seated at one end on the frame of the plow or its beam, and adapted to engage and disengage said recess K, and a rod P adapted to be reciprocated in the line of the plow and attached to said lever, and means substantially as shown for permitting said rod to have a limited longitudinal movement imparted to it at its front end without affecting said lever, for the purpose described.

3. In a wheel plow, the combination of an arm M, suitably attached to the forward end of the plow in position to be swung outwardly in either direction by the draft of the team in turning, and provided with a collar 9 and cotter S, the rear carrying wheel E, having a vertical axle D suitably journaled in the rear of the plow, and provided with a plate J having a recess K, a lever L pivoted to the frame or beam of the plow, and adapted to engage and disengage said recess, a sleeve R provided with longitudinal openings 8 and longitudinal slots 7, a rod P loosely connected at its front end to said arm M, and projected at its rear end within said opening 8, the said cotter extending into said slots 7, and a spring T seated on said rod between said collar 9 and said sleeve R, substantially as shown and for the purpose described.

In testimony whereof I affix my signature in presence of two witnesses.

CHAS. S. RUEF.

Witnesses:
F. T. HORSEMAN,
F. O. COLEMAN.